(12) United States Patent
Chiu

(10) Patent No.: US 9,533,893 B2
(45) Date of Patent: Jan. 3, 2017

(54) FAUCET WITH BUILT-IN FILTER UNITS

(71) Applicant: Hsin Tien Chiu, New Taipei (TW)

(72) Inventor: Hsin Tien Chiu, New Taipei (TW)

( * ) Notice: Subject to any disclaimer, the term of this patent is extended or adjusted under 35 U.S.C. 154(b) by 368 days.

(21) Appl. No.: 14/450,286

(22) Filed: Aug. 4, 2014

(65) Prior Publication Data

US 2015/0068968 A1 Mar. 12, 2015

(30) Foreign Application Priority Data

Sep. 9, 2013 (TW) .............................. 102216878 U

(51) Int. Cl.
| | | |
|---|---|---|
| C02F 1/00 | (2006.01) | |
| B01D 29/56 | (2006.01) | |
| B01D 63/04 | (2006.01) | |
| B01D 35/04 | (2006.01) | |
| B01D 29/62 | (2006.01) | |
| B01D 61/20 | (2006.01) | |
| B01D 63/02 | (2006.01) | |
| B01D 65/02 | (2006.01) | |
| C02F 1/28 | (2006.01) | |
| C02F 1/44 | (2006.01) | |

(52) U.S. Cl.
CPC ............... *C02F 1/003* (2013.01); *B01D 29/62* (2013.01); *B01D 35/046* (2013.01); *B01D 61/20* (2013.01); *B01D 63/02* (2013.01); *B01D 63/04* (2013.01); *B01D 65/02* (2013.01); *B01D 2313/18* (2013.01); *B01D 2317/02* (2013.01); *C02F 1/283* (2013.01); *C02F 1/444* (2013.01); *C02F 2209/40* (2013.01); *C02F 2307/06* (2013.01); *E03C 2201/40* (2013.01)

(58) Field of Classification Search
CPC .................................................... B01D 35/046
See application file for complete search history.

(56) References Cited

U.S. PATENT DOCUMENTS

| 5,744,033 A * | 4/1998 | Bertrand | .............. B01D 35/043 137/625.5 |
|---|---|---|---|
| 2013/0168309 A1* | 7/2013 | Loniewski | ............ E03C 1/0404 210/418 |
| 2014/0230143 A1* | 8/2014 | Morales | .................... E03C 1/04 4/676 |

* cited by examiner

*Primary Examiner* — Terry Cecil
(74) *Attorney, Agent, or Firm* — Leong C. Lei

(57) ABSTRACT

A faucet with built-in filter units includes a plurality of filter units arranged inside a main body of the faucet and also includes a dirt discharge valve so that the present invention requires no addition of external filters attached to the main body and enables automatic washing of hollow fiber membrane type filter units arranged therein so as to improve drinking water hygiene and extend lifespan of the filters.

6 Claims, 8 Drawing Sheets

FAUCET WITH BUILT-IN FILTER UNITS

TECHNICAL FIELD OF THE INVENTION

The present invention generally relates to a faucet with built-in filter units, and more particularly to a faucet that comprises a plurality of filter units arranged in a main body thereof so that the present invention requires no filter externally attached to the main body of the faucet.

DESCRIPTION OF THE PRIOR ART

Due to contamination caused by industrial waste water, chemicals, and air pollution, the modern water reservoirs often needs to carry out disinfection with chlorine. This makes tap water supplied from the water reservoir to the resident houses containing a substantial amount of chlorine and also containing a large amount of impurities and other harmful substances.

Due to such reasons, most of the houses are installed with filtering device for filtering and disinfection of the drinking water. Most of the filtering devices that are currently used are installed at a location adjacent to a faucet. Although they are effective in achieving the purposes of water filtering, their installations require piping to connect to a basin sink and accessories for securing to the faucet, making the installation very troublesome and time consuming.

Further, since the filtering device is often mounted on a basin sink or a faucet, it is very prominent and can be easily observed. In respect of interior decoration of house, such exposed installation of the filtering device is incompatibly striking and severely affects the aesthetics of the interior decoration. Further improvement is thus necessary.

In view of these, the present invention aims to provide a faucet with built-in filter units.

SUMMARY OF THE INVENTION

An object of the present invention is to provide a faucet with built-in filter units, which comprises a plurality of filter units arranged inside a main body of the faucet and also comprises a dirt discharge valve so that the present invention allows for no addition of external filters attached to the main body and enables automatic washing of hollow fiber membrane filter units arranged therein so as to improve drinking water hygiene and extend lifespan of the filters.

The present invention discloses a faucet with built-in filter units, which comprises: a main body, which is mountable to a fixture, such as a countertop and a sink basin. The main body comprises a receiving chamber, an ingress control compartment, and a first water supply hole and a second water supply hole formed therein, wherein the ingress control compartment comprises first, second, and third water inlet holes and first, second, and third water outlet holes, among which the first and second water inlet holes introduce cold water that is supplied through the first water supply hole and the third water inlet hole is in communication with hot water that is supplied through the second water supply hole; a purified water flow controller, which comprises a valve body rotatably mounted to a first side of the ingress control compartment and operable to selectively set the first water inlet hole and the first water outlet hole in communication with each other; a regular water flow controller, which comprises a valve stem rotatably mounted in the ingress control compartment, the valve stem having a circumference in which a plurality of guide channels that are operable to selectively set the second water inlet hole and the second water outlet hole in communication with each other and to selectively set the third water inlet hole and the third water outlet hole in communication with each other; a first filter unit, which is arranged in the receiving chamber of the main body and comprises a water inflow opening and a water outflow terminal, wherein the water inflow opening is in hermetic engagement with the first water outlet hole of the ingress control compartment and the first filter unit has a circumference that is spaced from the receiving chamber of the main body by a distance to define a first passage that is in communication with the second and third water outlet holes of the ingress control compartment; and a dispense faucet, which is mounted to a top end of the main body and comprises a water release pipe and an independent purified water inner tube arranged within the water release pipe to allow the filtered purified water to flow therethrough and comprising an independent purified water discharge opening, wherein the water release pipe is in communication with the first passage and the purified water inner tube is in communication with the water outflow terminal of the first filter unit. The present invention is structured to conceal the first filter unit for filtering water in the main body without being exposed so as to make the present invention more aesthetic.

The above first filter unit comprises: an enclosure, wherein a water inflow opening is formed in a bottom of the enclosure and a water outflow terminal and a dirt discharge hole are formed in the top of the enclosure in such a way that the dirt discharge hole is in communication with the water release pipe; a guide tube, which is arranged in the enclosure in an axial direction and is connected to the water outflow terminal and has a tubular wall in which a plurality of through apertures is formed; and a plurality of hollow fiber membrane tubes, which is arranged, in the axial direction, between an outer circumference of the guide tube and the enclosure in such a way that each of the hollow fiber membrane tubes has upper and lower ends that are mounted, with sealant, to locations close to top and bottom of the enclosure so that the upper ends of the hollow fiber membrane tubes and the enclosure define therebetween an upper water collection zone and the lower ends of the hollow fiber membrane tubes and the bottom of the enclosure define a lower water collection zone; and a dirt discharge valve, which is arranged in the dirt discharge hole to normally close the dirt discharge hole. As such, when the dirt discharge hole is closed, water that is introduced in through the water inflow opening will flow into each of the hollow fiber membrane tubes. Since the dirt discharge hole is closed, the pressure of the water received in the first filter unit rises, forcing the water to penetrate through walls of the hollow fiber membrane tubes and flowing along the guide tube and moving from the water outflow terminal through the purified water inner tube to dispense outward to allow user to receive the filtered purified water. Or, the dirt discharge valve is operated to open the dirt discharge hole and water is introduced in through the water inflow opening, so that water will flow into each of the hollow fiber membrane tubes to carry away the impurities attached to each of the hollow fiber membrane tubes and will then flow through the dirt discharge hole to be discharged through the water release pipe so as to achieve the purposes of washing the first filter unit and thus extending the lifespan of the first filter unit.

The faucet with built-in filter units disclosed in the present invention further comprises a second filter unit, which is arranged in the main body and is located between the first and second water inlet holes of the ingress control compartment and the first water supply hole of the main body, wherein the second filter unit comprises a water inflow terminal and a water outflow terminal, of which the water outflow terminal is in communication with the first and second water inlet holes of the ingress control compartment and the water inflow terminal is in communication with the first water supply hole of the main body. As such, with the purified water flow controller opening the first water inlet hole and the regular water flow controller closing the second water inlet hole, tap water that is introduced in through the first water supply hole of the present invention is first filtered by the second filter unit and then flows through the first water inlet hole of the ingress control compartment to move through the first water outlet hole into the first filter unit for further filtration so that the purified water that has been filtered can be dispensed outward through the purified water inner tube arranged inside the water release pipe. Or, with the purified water flow controller closing the first water inlet hole and the regular water flow controller opening the second water inlet hole, the tap water that is introduced in through the first water supply hole of the present invention is first filtered by the second filter unit and then flows through the second water inlet hole, the second water outlet hole, and the first passage to then dispense outward through the water release pipe to be used as rinsing water.

The above second filter unit can be an active carbon filter or a filter comprising PP fabric and the present invention is not limited thereto.

The faucet with built-in filter units disclosed in the present invention further comprises a third filter unit, wherein the third filter unit is arranged in the main body and is located between the water outflow terminal of the first filter unit and the purified water inner tube and the third filter unit comprises a housing, the housing comprising a water inflow hole and a water outflow hole formed therein, the housing comprising a filtering material arranged therein and between the water inflow hole and the water outflow hole, the water inflow hole of the third filter unit being in communication with the water outflow terminal of the first filter unit, the water outflow hole being connected to the purified water inner tube, the housing of the third filter unit being spaced from the main body by a distance to define a second passage in such a way that the second passage and the first passage are in communication with each other and are in communication with the water release pipe.

The filtering material arranged in the third filter unit can be compressed active carbon, silver-included active carbon, and mainfan stone and the present invention is not limited thereto.

The faucet with built-in filter units disclosed in the present invention is structured such that the first, second, and third filter units are concealed in the main body so that no incompatibly striking part is exposed in the outside appearance thereof, allowing the faucet and the first, second, and third filter units to be unitarily combined to improve the overall aesthetics thereof and meet the need of interior decoration and the filter units can be replaced according to the condition of use.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
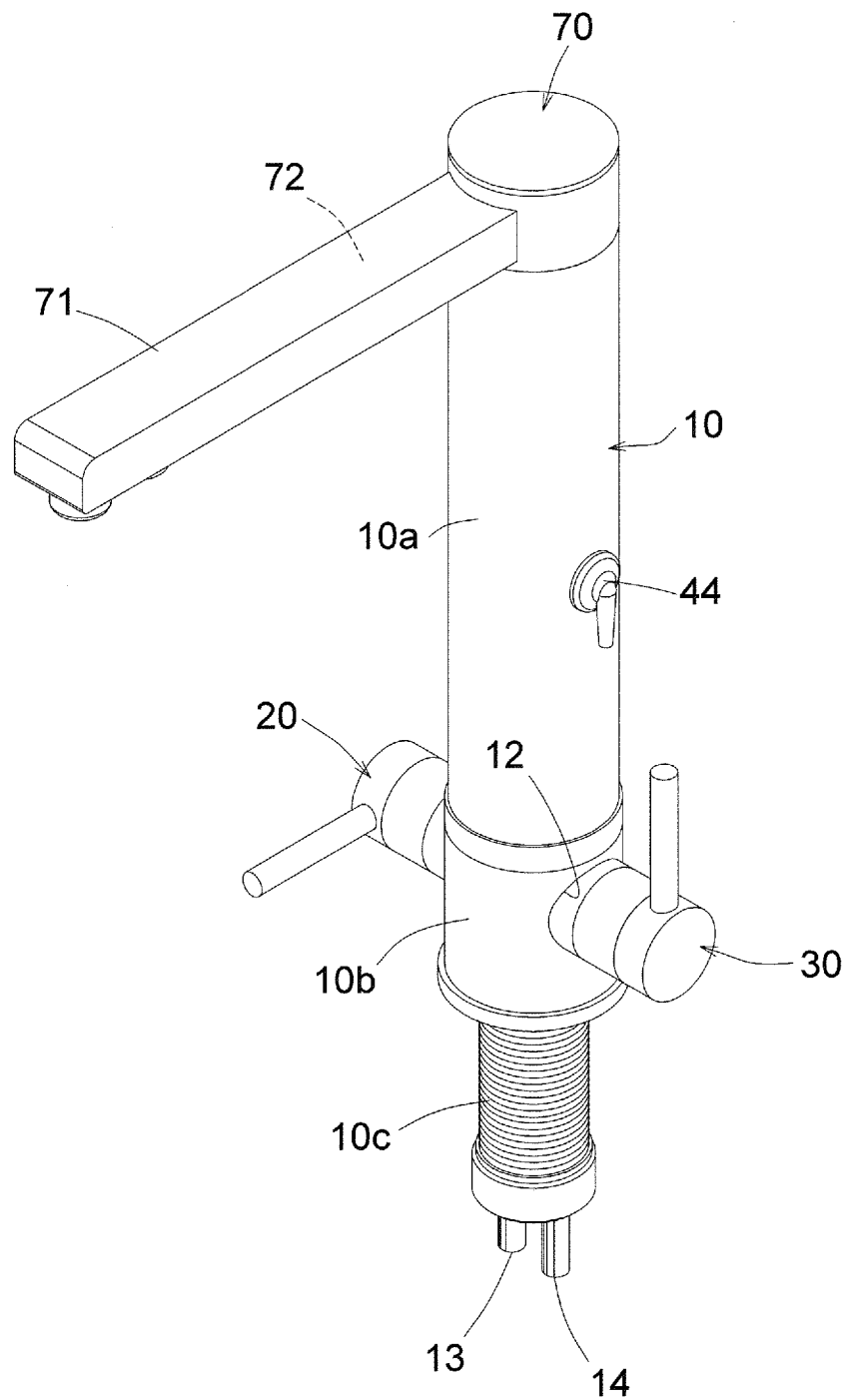
FIG. 1 is a perspective view of the present invention.
Figure 2:
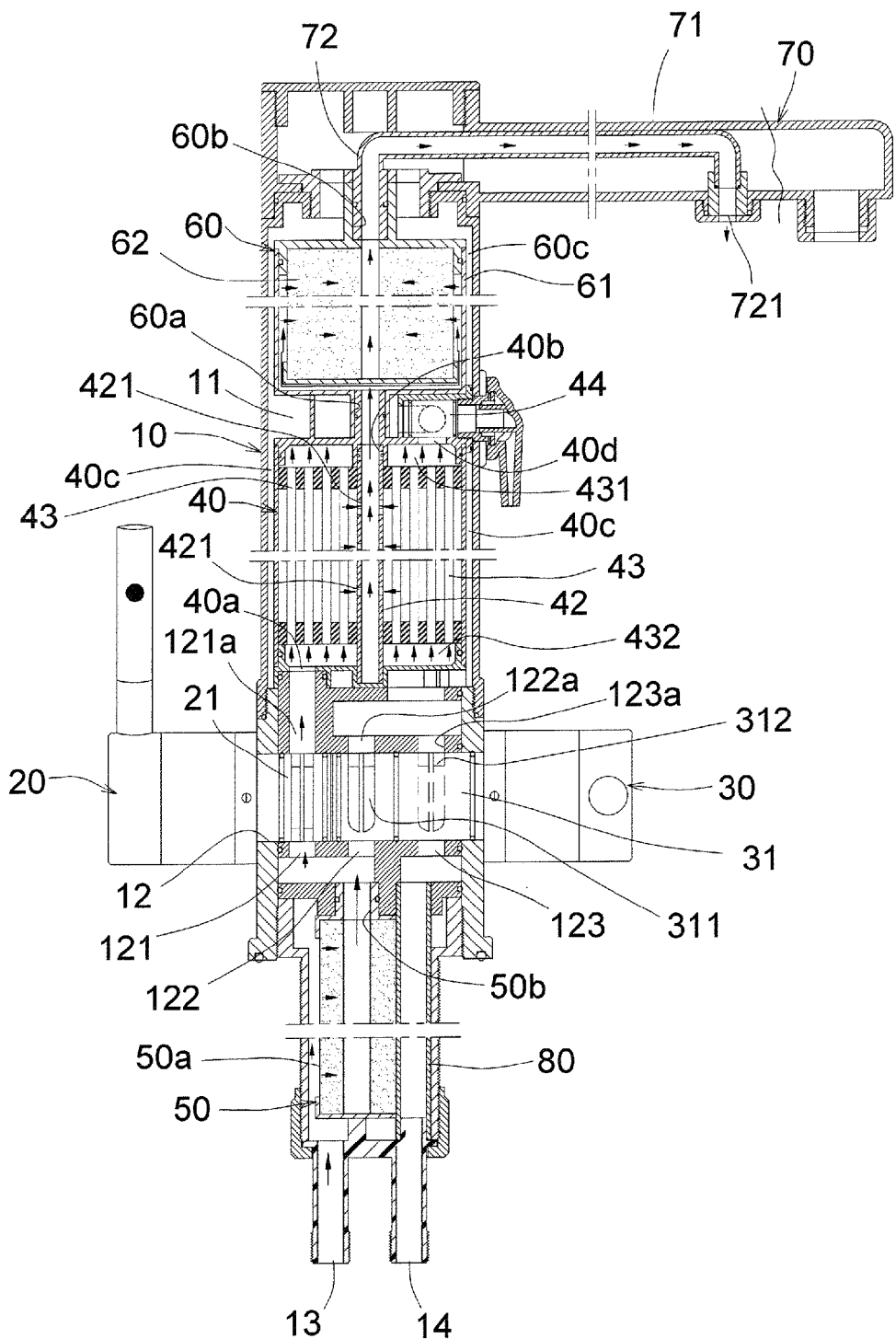
FIG. 2 is a cross-sectional view of the present invention showing a condition of using purified water.
Figure 3:
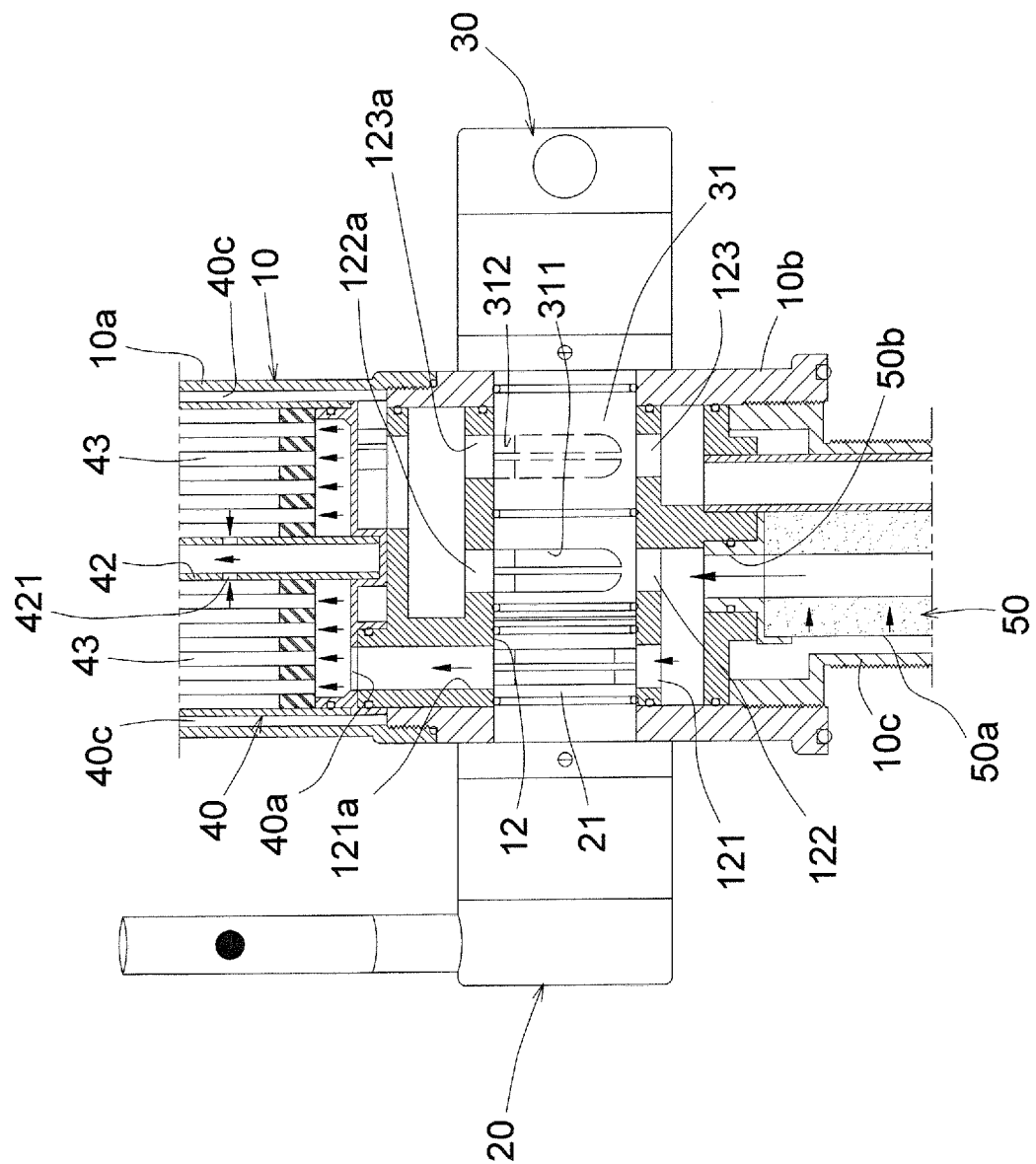
FIG. 3 is a cross-sectional view showing a first filter unit and a main body of the present invention.

Referring to FIGS. 1, 2, and 3, the present invention relates to a faucet with built-in filter units, which comprises a plurality of filter units (40, 50, 60) arranged in a main body (10) of the faucet and comprises a dirt discharge valve (44), so that the present invention requires no additional filters externally attached to the main body (10) of the faucet and enables automatic washing of the internally arranged hollow fiber membrane type filter units (40) in order to improve drinking water hygiene and extend the lifespan of the filters.

As shown in FIGS. 1, 2, 3, and 4, the faucet with built-in filter units as disclosed in the present invention comprises: a main body (10), which is mountable to a fixture, such as a countertop and a sink basin. The main body (10) comprises a receiving chamber (11), an ingress control compartment (12), and a first water supply hole (13) and a second water supply hole (14) formed therein, wherein the ingress control compartment (12) comprises first, second, and third water inlet holes (121, 122, 123) and first, second, and third water outlet holes (121a, 122a, 123a), among which the first and second water inlet holes (121, 122) introduce water that is supplied through the first water supply hole (13) (such as tap water) and the third water inlet hole (123) is in communication with water that is supplied through the second water supply hole (14) (such as tap water or hot water that has been heated); a purified water flow controller (20), which comprises a valve body (21) rotatably mounted to a first side of the ingress control compartment (12) and operable to selectively set the first water inlet hole (121) and the first water outlet hole (121a) in communication with each other; a regular water flow controller (30), which comprises a valve stem (31) rotatably mounted to a second side of the ingress control compartment (12), the valve stem (31) having a circumference in which a plurality of guide channels (311, 312) is formed in such a way that at least one of the guide channels is operable to selectively set the second water inlet hole (122) and the second water outlet hole (122*a*) in communication with each other and at least the other one of the guide channels is operable to selectively set the third water inlet hole (123) and the third water outlet hole (123*a*) in communication with each other; a first filter unit (40), which is arranged in the receiving chamber (11) of the main body (10) and comprises a water inflow opening (40*a*) and a water outflow terminal (40*b*), wherein the water inflow opening (40*a*) is in hermetic engagement with the first water outlet hole (121*a*) of the ingress control compartment (12) and the first filter unit (40) has a circumference that is spaced from the receiving chamber (11) of the main body (10) by a distance to define a first passage (40*c*) with the first passage (40*c*) being in communication with the second and third water outlet holes (122*a*, 123*a*) of the ingress control compartment (12); and a dispense faucet (70), which is mounted to a top end of the main body (10) and comprises a water release pipe (71) and an independent purified water inner tube (72) arranged within the water release pipe (71), the purified water inner tube (72) comprising an independent purified water discharge opening (721), wherein the water release pipe (71) is in communication with the first passage (40*c*) and the purified water inner tube (72) is in communication with the water outflow terminal (40*b*) of the first filter unit (40). The present invention is structured to conceal the first filter unit (40) for filtering water in the main body (10) without being exposed so as to make the present invention more aesthetic.

Figure 4:
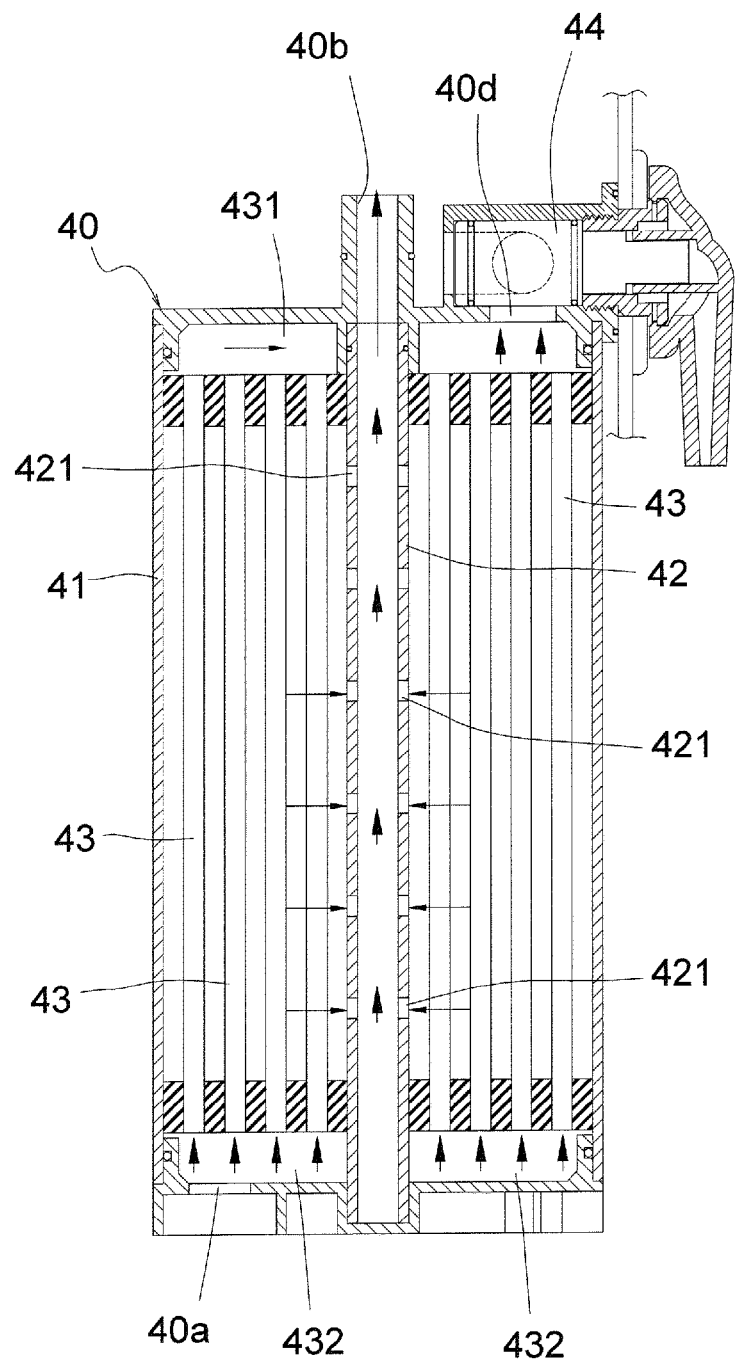
FIG. 4 is a cross-sectional view showing the first filter unit of the present invention.
Figure 8:
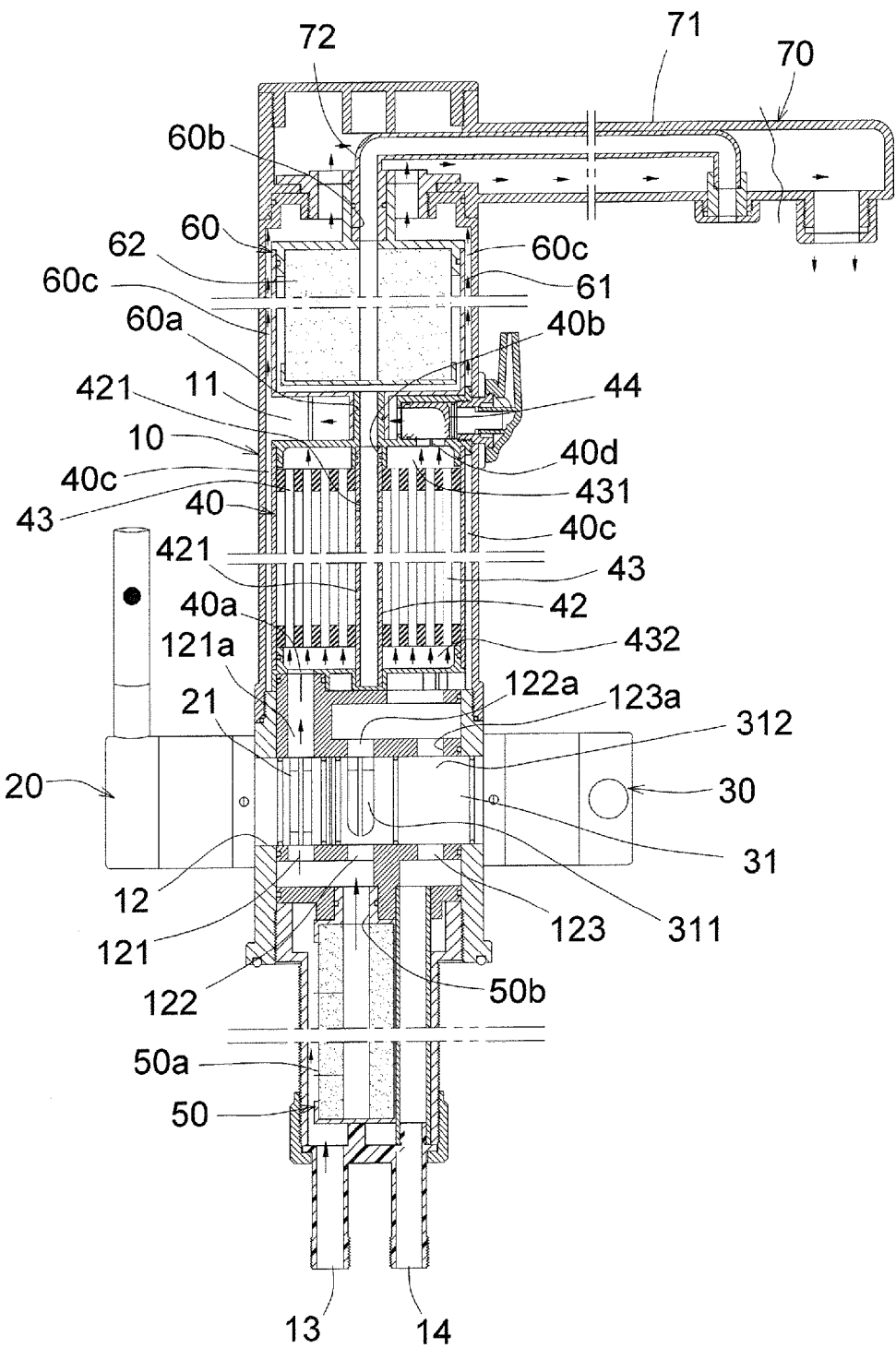
FIG. 8 is a cross-sectional view showing the first filter unit of the present invention in a dirt discharging and washing condition.

As shown in FIGS. 2, 3, and 4, the first filter unit (40) comprises: an enclosure (41), wherein a water inflow opening (40*a*) is formed in a bottom of the enclosure (41) and a water outflow terminal (40*b*) and a dirt discharge hole (40*d*) are formed in the top of the enclosure (41) in such a way that the dirt discharge hole (40*d*) is in communication with the water release pipe (71); a guide tube (42), which is arranged in the enclosure in an axial direction and is connected to the water outflow terminal (40*b*) and has a tubular wall in which a plurality of through apertures (421) is formed; and a plurality of hollow fiber membrane tubes (43), which is arranged, in the axial direction, between an outer circumference of the guide tube (42) and the enclosure (41) in such a way that each of the hollow fiber membrane tubes (43) has upper and lower ends that are mounted, with sealant, to locations close to top and bottom of the enclosure (41) so that the upper ends of the hollow fiber membrane tubes (43) and the enclosure (41) define therebetween an upper water collection zone (431) and the lower ends of the hollow fiber membrane tubes (43) and the bottom of the enclosure (41) define a lower water collection zone (432); and a dirt discharge valve (44), which is arranged in the dirt discharge hole (40*d*) to normally close the dirt discharge hole (40*d*). As shown in FIGS. 2 and 3, when the dirt discharge hole (40*d*) is closed, water that is introduced in through the water inflow opening (40*a*) will flow into each of the hollow fiber membrane tubes (43). Since the dirt discharge hole (40*d*) is closed, the pressure of the water received in the upper water collection zone (431) of the first filter unit (40) rises, forcing the water to penetrate through walls of the hollow fiber membrane tubes (43) and flowing along the guide tube (42) and moving from the water outflow terminal (40*b*) through the purified water inner tube (72) to dispense outward to allow user to receive the filtered purified water. Or, as shown in FIG. 8, the dirt discharge valve (44) is operated to open the dirt discharge hole (40*d*) and water is introduced in through the water inflow opening (40*a*), so that water will flow into each of the hollow fiber membrane tubes (43) to carry away the impurities attached to each of the hollow fiber membrane tubes (43) and will then flow through the dirt discharge hole (40*d*) to be discharged through the water release pipe (71) so as to achieve the purposes of washing the first filter unit (40) and thus extending the lifespan of the first filter unit (40).

Figure 5:
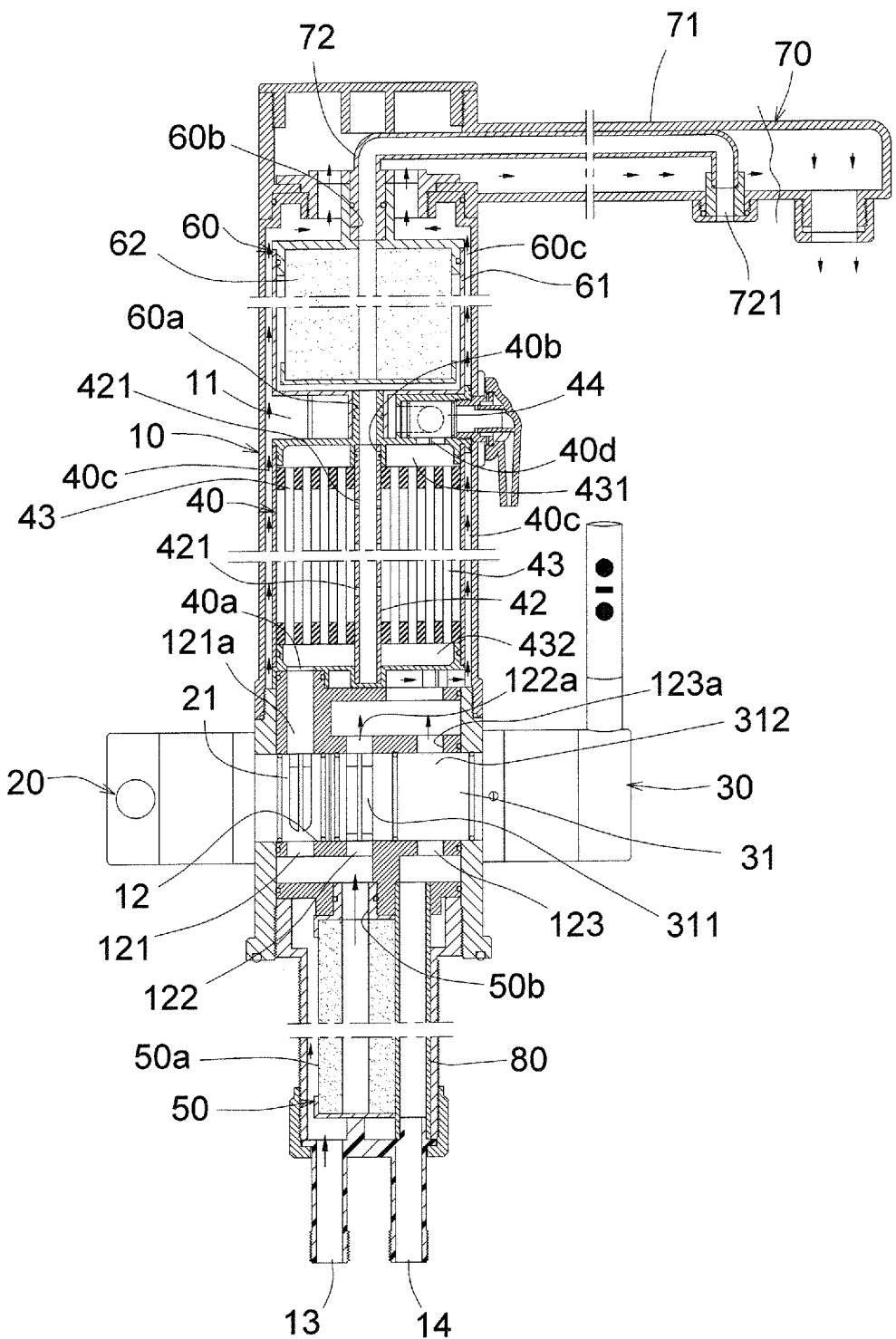
FIG. 5 is a cross-sectional view of the present invention showing a condition of using regular water.
Figure 6:
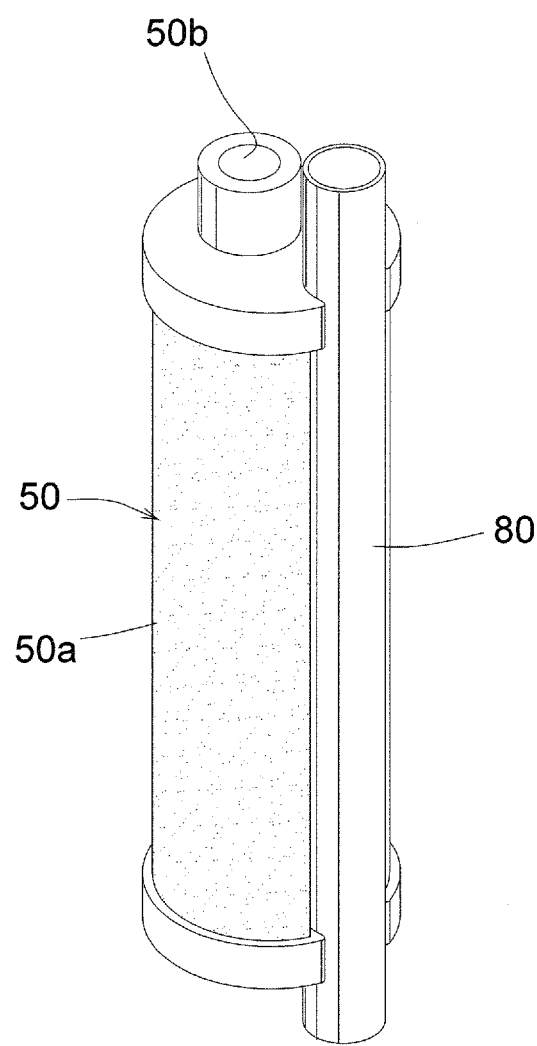
FIG. 6 is a perspective view showing a second filter unit of the present invention.

The faucet with built-in filter units disclosed in the present invention, as shown in FIGS. 1, 2, and 6, further comprises a second filter unit (50), which is arranged in the receiving chamber (11) of the main body (10) and is located between the first and second water inlet holes (121, 122) of the ingress control compartment (12) and the first water supply hole (13) of the main body (10), wherein the second filter unit (50) comprises a water inflow terminal (50*a*) and a water outflow terminal (50*b*), of which the water outflow terminal (50*b*) is in communication with the first and second water inlet holes (121, 122) of the ingress control compartment (12) and the water inflow terminal (50*a*) is in communication with the first water supply hole (13) of the main body (10). As shown in FIG. 2, with the purified water flow controller (20) opening the first water inlet hole (121) and the regular water flow controller (30) closing the second water inlet hole (122), tap water that is introduced in through the first water supply hole (13) of the present invention is first filtered by the second filter unit (50) and then flows through the first water inlet hole (121) of the ingress control compartment (12) to move through the first water outlet hole (121*a*) into the first filter unit (40) for further filtration so that the purified water that has been filtered can be dispensed outward through the purified water inner tube (72) arranged inside the water release pipe (71). Or, as shown in FIG. 5, with the purified water flow controller (20) closing the first water inlet hole (121) and the regular water flow controller (30) opening the second water inlet hole (122), the tap water that is introduced in through the first water supply hole (13) of the present invention is first filtered by the second filter unit (50) and then flows through the second water inlet hole (122), the second water outlet hole (122*b*), and the first passage (40*c*) to then dispense outward through the water release pipe (71) to be used as rinsing water.

The second filter unit (50) can be an active carbon filter or a filter comprising PP fabric and the present invention is not limited thereto.

The regular water flow controller (30) disclosed in the present invention can be rotated to completely close the second water inlet hole (122) and only opens the third water inlet hole (123) to allow water supplied through the second water supply hole (14) (such as hot water that has been heated) to flow therethrough and dispense outward through the water release pipe (71) or the regular water flow controller (20) can be rotated to completely close the third water inlet hole (123) with only the second water inlet hole (122) open, so that the present invention allows the tap water supplied through the first water supply hole (13) to flow in through the second water inlet hole (122) and then flows through the second water outlet hole (122*a*), moving along the first passage (40*c*) to discharge cold water through the water release pipe (71). Or, the regular water flow controller (30) can be rotated to have the guide channel (311) set the second water inlet hole (122) and the second water outlet hole (122*a*) in communication with each other and the other guide channel (312) set the third water inlet hole (123) and the third water outlet hole (123a) in communication with each other, wherein through variation of the opening extent of each of the guide channels (311, 312), the amounts of the water (cold water) that flows through the second water outlet hole (122a) and the water (such as hot water) that flows through the third water outlet hole (123a) can be varied to allow a user to set a proper water temperature.

In the faucet with built-in filter units disclosed in the present invention, the second water supply hole (14) of the main body (10) and the third water inlet hole (123) are connected to each other with a connection tube (80). The connection tube (80) is arranged to extend axially along an outer circumference of the second filter unit (50).

Figure 7:
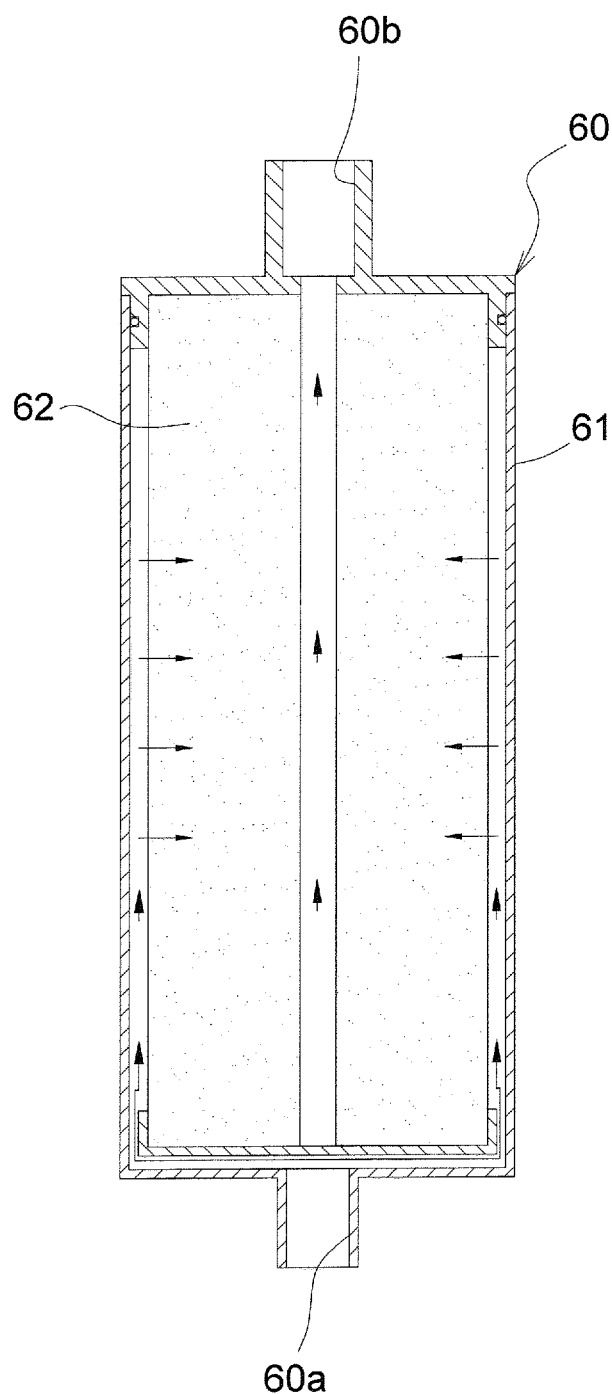
FIG. 7 is a cross-sectional view showing a third filter unit of the present invention.

As shown in FIGS. 2 and 7, the faucet with built-in filter units disclosed in the present invention further comprises a third filter unit (60), wherein the third filter unit (60) is arranged in the receiving chamber (11) of the main body (10) and is located between the water outflow terminal (40b) of the first filter unit (40) and the purified water inner tube (72) and the third filter unit (60) comprises a housing (61), the housing (61) comprising a water inflow hole (60a) and a water outflow hole (60b) formed therein, the housing (61) comprising a filtering material (62) arranged therein and between the water inflow hole (60a) and the water outflow hole (60b), the water inflow hole (60a) of the third filter unit (60) being in communication with the water outflow terminal (40b) of the first filter unit (40), the water outflow hole (60b) being connected to the purified water inner tube (72), the housing (61) of the third filter unit (60) being spaced from the main body (10) by a distance to define a second passage (60c) in such a way that the second passage (60c) and the first passage (40c) are in communication with each other and are in communication with the water release pipe (71).

The filtering material (62) arranged in the third filter unit (60) can be compressed active carbon, silver-included active carbon, and mainfan stone and the present invention is not limited thereto.

The faucet with built-in filter units disclosed in the present invention is structured such that the first, second, and third filter units (40, 50, 60) are concealed in the main body (10) so that no incompatibly striking part is exposed in the outside appearance thereof, allowing the faucet and the first, second, and third filter units (40, 50, 60) to be unitarily combined to improve the overall aesthetics thereof and meet the need of interior decoration.

The faucet with built-in filter units disclosed in the present invention is structured such that the main body (10) can be formed by coupling tubular segments (10a, 10b, 10c) to each other with the bottom tubular segment (10c) having an outer circumference that forms a thread for mounting to a fixed surface such as a countertop and the present invention is not limited to any number of the tubular segments (10a, 10b, 10c) that are combined to form the main body (10).

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A faucet with built-in filter units, comprising:
a main body, which comprises a receiving chamber, an ingress control compartment, and a first water supply hole and a second water supply hole formed therein, wherein the ingress control compartment comprises first, second, and third water inlet holes and first, second, and third water outlet holes, among which the first and second water inlet holes introduce water that is supplied through the first water supply hole and the third water inlet hole is in communication with water that is supplied through the second water supply hole;
a purified water flow controller, which comprises a valve body rotatably mounted to a first side of the ingress control compartment and operable to selectively set the first water inlet hole and the first water outlet hole in communication with each other;
a regular water flow controller, which comprises a valve stem rotatably mounted to a second side of the ingress control compartment, the valve stem having a circumference in which a plurality of guide channels is formed in such a way that at least one of the guide channels is operable to selectively set the second water inlet hole and the second water outlet hole in communication with each other and at least the other one of the guide channels is operable to selectively set the third water inlet hole and the third water outlet hole in communication with each other;
a first filter unit, which is arranged in the receiving chamber of the main body and comprises a water inflow opening and a water outflow terminal, wherein the water inflow opening is in hermetic engagement with the first water outlet hole of the ingress control compartment and the first filter unit has a circumference that is spaced from the receiving chamber of the main body by a distance to define a first passage with the first passage being in communication with the second and third water outlet holes of the ingress control compartment; and
a dispense faucet, which is mounted to a top end of the main body and comprises a water release pipe, an independent purified water inner tube being arranged within the water release pipe and comprising an independent purified water discharge opening, wherein the water release pipe is in communication with the first passage and the purified water inner tube is in communication with the water outflow terminal of the first filter unit.

2. The faucet with built-in filter units according to claim 1, wherein the first filter unit comprises: an enclosure, wherein a water inflow opening is formed in a bottom of the enclosure and a water outflow terminal and a dirt discharge hole are formed in the top of the enclosure in such a way that the dirt discharge hole is in communication with the water release pipe; a guide tube, which is arranged in the enclosure in an axial direction and is connected to the water outflow terminal and has a tubular wall in which a plurality of through apertures are formed; and a plurality of hollow fiber membrane tubes, which are arranged, in the axial direction, between an outer circumference of the guide tube and the enclosure in such a way that each of the hollow fiber membrane tubes has upper and lower ends that are mounted, with sealant, to locations close to top and bottom of the enclosure so that the upper ends of the hollow fiber membrane tubes and the enclosure define therebetween an upper water collection zone and the lower ends of the hollow fiber membrane tubes and the bottom of the enclosure define a lower water collection zone; and a dirt discharge valve, which is arranged in the dirt discharge hole to selectively open/close the dirt discharge hole.

3. The faucet with built-in filter units according to claim 1 further comprising a second filter unit, which is arranged in the receiving chamber of the main body and is located between the first and second water inlet holes of the ingress control compartment and the first water supply hole of the main body, wherein the second filter unit comprises a water inflow terminal and a water outflow terminal, of which the water outflow terminal is in communication with the first and second water inlet holes of the ingress control compartment and the water inflow terminal is in communication with the first water supply hole of the main body.

4. The faucet with built-in filter units according to claim 1 further comprising a third filter unit, wherein the third filter unit is arranged in the receiving chamber of the main body and is located between the water outflow terminal of the first filter unit and the purified water inner tube and the third filter unit comprises a housing, the housing comprising a water inflow hole and a water outflow hole formed therein, the housing comprising a filtering material arranged therein and between the water inflow hole and the water outflow hole, the water inflow hole of the third filter unit being in communication with the water outflow terminal of the first filter unit, the water outflow hole being connected to the purified water inner tube, the housing of the third filter unit being spaced from the main body by a distance to define a second passage in such a way that the second passage and the first passage are in communication with each other and are in communication with the water release pipe.

5. The faucet with built-in filter units according to claim 1, wherein the main body is formed by coupling multiple tubular segments to each other.

6. The faucet with built-in filter units according to claim 1, wherein the main body comprises a bottom segment that has an outer circumference in which a thread is formed.

* * * * *